(12) United States Patent
Temple et al.

(10) Patent No.: US 10,637,647 B2
(45) Date of Patent: Apr. 28, 2020

(54) CONTROL DEVICE INCLUDING DIRECT MEMORY ACCESS CONTROLLER FOR SECURING DATA AND METHOD THEREOF

(71) Applicant: Infineon Technologies AG, Neubiberg (DE)

(72) Inventors: Christopher Temple, Munich (DE); Simon Cottam, Bristol (GB); Frank Hellwig, Wunstorf (DE); Antonio Vilela, Mering (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 182 days.

(21) Appl. No.: 15/486,367

(22) Filed: Apr. 13, 2017

(65) Prior Publication Data

US 2017/0302441 A1 Oct. 19, 2017

(30) Foreign Application Priority Data

Apr. 13, 2016 (DE) .................. 10 2016 106 871

(51) Int. Cl.
*H04L 9/06* (2006.01)
*H04L 9/00* (2006.01)
(Continued)

(52) U.S. Cl.
CPC ............ *H04L 9/0643* (2013.01); *G06F 21/64* (2013.01); *G06F 21/79* (2013.01); *G06F 21/85* (2013.01);
(Continued)

(58) Field of Classification Search
CPC . H04L 9/0643; H04L 9/004; H04L 2209/127; H04L 2209/84; H04L 67/12;
(Continued)

(56) References Cited

U.S. PATENT DOCUMENTS 6,468,160 B2 * 10/2002 Eliott ............... A63F 13/12
463/43
9,239,247 B1 1/2016 Angus et al.
(Continued)

FOREIGN PATENT DOCUMENTS

TW 201502847 A * 1/2015 ............ G06F 21/60
WO WO-2010021269 A1 * 2/2010 ............ G06F 21/57

OTHER PUBLICATIONS

Author: Hendrik C. Schweppe Title: (Security and Privacy in Automotive On-Board Networks) Nov. 8, 2012 Publisher: HAL Id: tel-01157229 https://pastel.archives-ouvertes.fr/tel-01157229 (Year: 2012).*

(Continued)

*Primary Examiner* — Jeffrey C Pwu
*Assistant Examiner* — Ali H. Cheema
(74) *Attorney, Agent, or Firm* — Viering, Jentschura & Partner MBB

(57) ABSTRACT

According to various embodiments, a control device is described including an application core including a processor, a memory and a direct memory access controller and a security module coupled to the application core via a computer bus. The direct memory access controller is configured to read data from the memory, generate a hash value for the data and provide the hash value to the security module via the computer bus. The security module is configured to process the hash value.

18 Claims, 6 Drawing Sheets

(51) Int. Cl.
*G06F 21/79* (2013.01)
*G06F 21/85* (2013.01)
*G06F 21/64* (2013.01)
G06F 21/78 (2013.01)
G06F 21/44 (2013.01)
G06F 21/55 (2013.01)
G06F 21/34 (2013.01)
H04L 9/32 (2006.01)

(52) U.S. Cl.
CPC .............. *H04L 9/004* (2013.01); *G06F 21/34* (2013.01); *G06F 21/44* (2013.01); *G06F 21/554* (2013.01); *G06F 21/78* (2013.01); *H04L 9/00* (2013.01); *H04L 9/3247* (2013.01); *H04L 2209/127* (2013.01); *H04L 2209/84* (2013.01)

(58) Field of Classification Search
CPC ....... H04L 9/3239; H04L 9/32; H04L 9/3247; G06F 21/64; G06F 21/79; G06F 21/85; G06F 21/80; G06F 21/57; G06F 21/554; G06F 21/572; G06F 13/385; G06F 21/34; G06F 21/78; G06F 21/44; G06F 12/14; G06F 12/1458; H04W 4/70; B60F 21/80; A63F 13/12
USPC .................. 713/170, 189, 193, 194; 380/28; 455/420; 726/22, 15; 711/103
See application file for complete search history.

(56) References Cited

U.S. PATENT DOCUMENTS

| | | | | |
|---|---|---|---|---|
| 9,450,761 | B2* | 9/2016 | Minamimoto | H04L 9/3247 |
| 9,703,960 | B2* | 7/2017 | Hong | G06F 21/57 |
| 9,792,440 | B1* | 10/2017 | Wang | G06F 21/44 |
| 2004/0185842 | A1* | 9/2004 | Spaur | B60R 25/04 |
| | | | | 455/420 |
| 2004/0193763 | A1* | 9/2004 | Iizuka | G06F 13/385 |
| | | | | 710/52 |
| 2006/0129848 | A1* | 6/2006 | Paksoy | G06F 21/78 |
| | | | | 713/193 |
| 2006/0198515 | A1* | 9/2006 | Forehand | G06F 21/80 |
| | | | | 380/28 |
| 2007/0056032 | A1* | 3/2007 | Valenci | H04L 12/4641 |
| | | | | 726/15 |
| 2008/0059811 | A1* | 3/2008 | Sahita | G06F 21/85 |
| | | | | 713/194 |
| 2008/0148065 | A1* | 6/2008 | Westerinen | G06F 21/554 |
| | | | | 713/189 |
| 2010/0135484 | A1* | 6/2010 | Nishikawa | H04L 9/3239 |
| | | | | 380/28 |
| 2011/0191599 | A1* | 8/2011 | Chou | G06F 12/14 |
| | | | | 713/193 |
| 2012/0079287 | A1 | 3/2012 | Leclercq | |
| 2015/0095648 | A1* | 4/2015 | Nix | H04W 4/70 |
| | | | | 713/170 |
| 2015/0254458 | A1* | 9/2015 | Hong | G06F 21/57 |
| | | | | 726/22 |
| 2016/0026783 | A1* | 1/2016 | Buer | G06F 21/34 |
| | | | | 711/103 |
| 2016/0070929 | A1 | 3/2016 | Potlapally et al. | |
| 2016/0070934 | A1* | 3/2016 | Frank | G06F 12/1458 |
| | | | | 711/103 |
| 2016/0344705 | A1* | 11/2016 | Stumpf | H04L 67/12 |

OTHER PUBLICATIONS

Design, Implementation, and Evaluation of a Vehicular Hardware Security Module Marko Wolf and Timo Gendrullis pp. 2 (Year: 2012).*

Hardware-Security Technologies for Industrial IoT: TrustZone and Security Controller Christian Lesjak, Daniel Hein and Johannes Winter pp. 7, Nov. 9-12 (Year: 2015).*

Securing Vehicular On-Board IT Systems: The EVITA Project by Dr.-Ing. Olaf Henniger, Dr. Alastair Ruddle, Dipl.-Inf. Hervé Seudié Dr.-Ing. Benjamin Weyl, Dr.-Ing. Marko Wolf, Dr.-Ing. Thomas Wollinger pp. 14 (Year: 2009).*

Security and privacy in automotive on-board networks by Hendrik Schweppe Nov. 8, 2012 pp. 226 (Year: 2012).*

Apvrille Ludovic et al., "Secure Automotive On-Board Electronics Network Architecture", FISITA 2010, World Automotive Congress, May 30-Jun. 4, 2010, Budapest, Hungary.

* cited by examiner

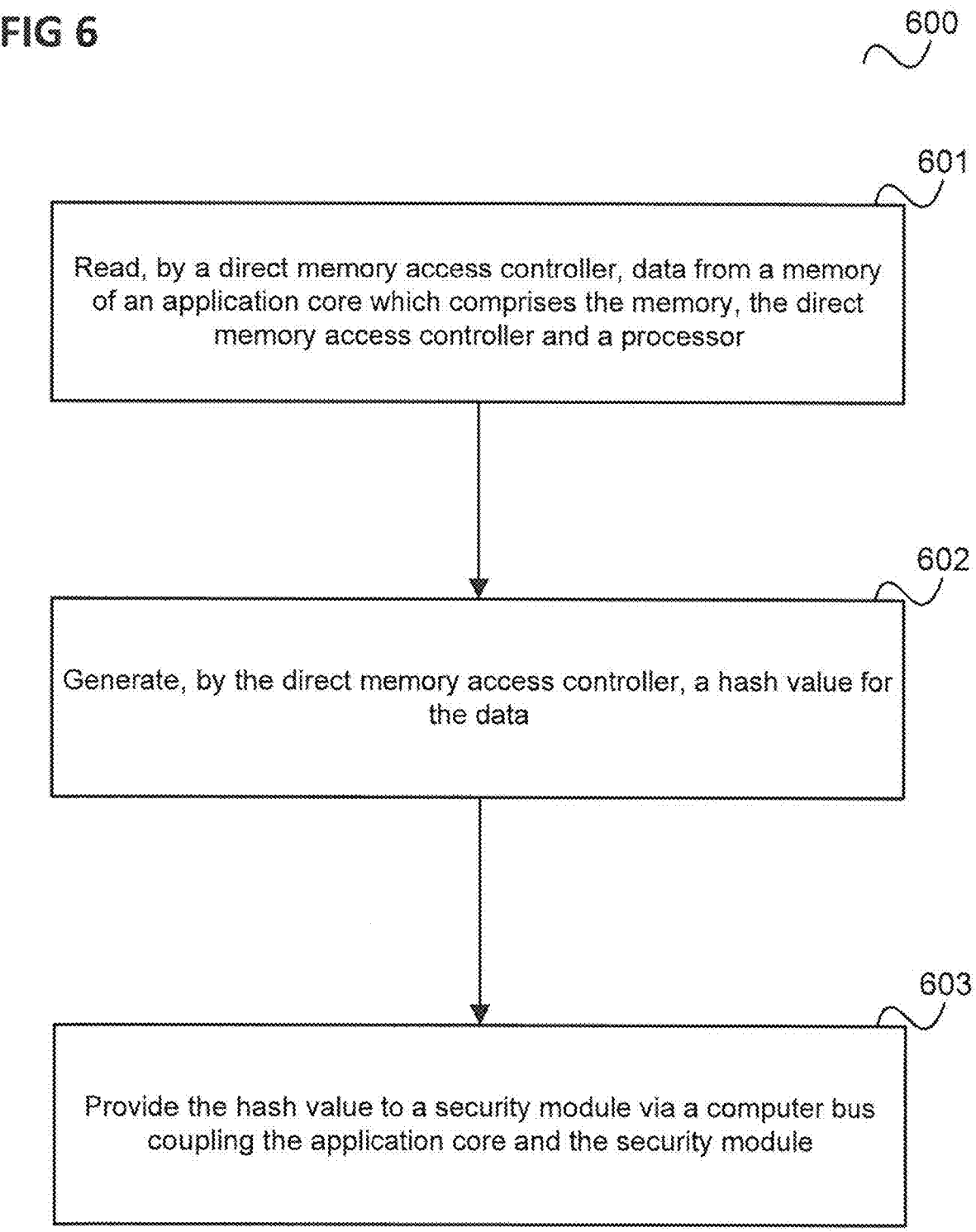

CONTROL DEVICE INCLUDING DIRECT MEMORY ACCESS CONTROLLER FOR SECURING DATA AND METHOD THEREOF

CROSS-REFERENCE TO RELATED APPLICATION

This application claims priority to German Patent Application Serial No. 10 2016 106 871.3, which was filed Apr. 13, 2016, and is incorporated herein by reference in its entirety.

TECHNICAL FIELD

The present disclosure relates to control devices and methods for securing data.

BACKGROUND

Automotive applications based on vehicle-to-vehicle and vehicle-to-infrastructure communications are expected to decrease the number of traffic accidents in the future and allow intelligent traffic management. However, malicious attacks on embedded IT systems and networks implementing functionalities of this type and on messages transiting in a vehicle in context of this scenario, such as sending fake messages may have a severe impact. Thus, an onboard network needs to provide appropriate security measures in order to protect against malicious messages. Sensitive in-vehicle data must be trustable and protected from modification. Thus, within the context of cyber secure vehicle systems an increased need for specific security operations has emerged. Efficient approaches to implement security operations in an in-vehicle network are desirable.

SUMMARY

According to one embodiment, a control device is provided including an application core including a processor, a memory and a direct memory access controller and a security module coupled to the application core via a computer bus. The direct memory access controller is configured to read data from the memory, generate a hash value for the data and provide the hash value to the security module via the computer bus. The security module is configured to process the hash value.

According to a further embodiment, a method for securing data according to the above control device is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 6 shows a flow diagram illustrating a method for securing data.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
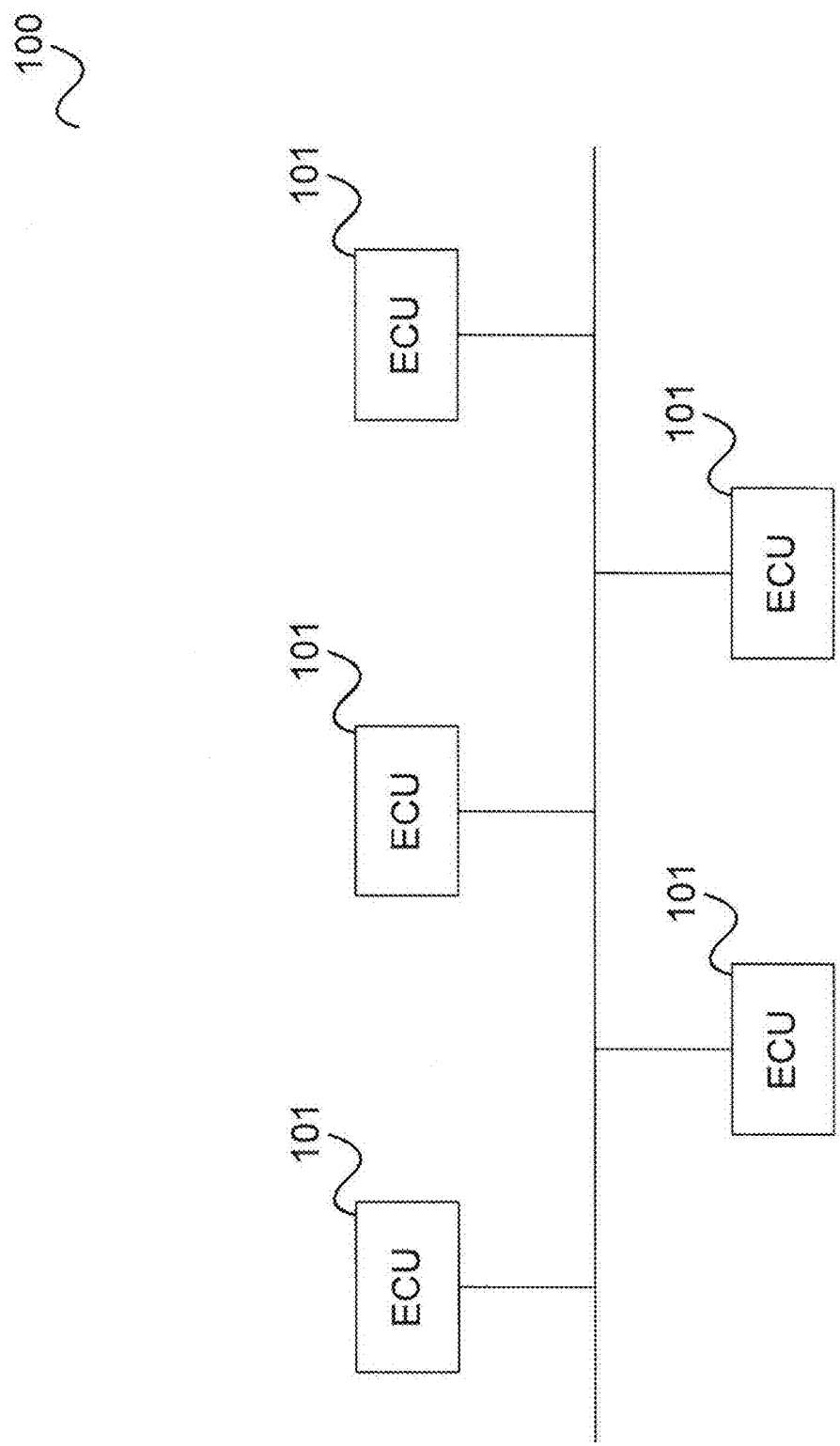
FIG. 1 shows an in-vehicle network.

FIG. 1 shows an in-vehicle network 100.

The in-vehicle network (e.g. located in a car) includes a plurality of electronic control units (ECUs) 101 coupled via an in-vehicle (computer) bus 102 such as a CAN (Controller Area Network) bus.

An ECU 101 is an embedded system that processes information from different vehicle sub-systems and controls actuators to react on system events accordingly. One example for ECUs is the engine control unit (or engine control module (ECM)) which is responsible for controlling a series of actuators on a combustion engine to ensure optimal engine performance. The engine's actuators are controlled based on complex system parameters, such as ignition timing, and are configured and adapted to the specific motor characteristic during vehicle production. Manipulation of these system parameters is an interesting attack target since manipulations may result in modified motor characteristics which may give an attacker the ability to improve the performance of the engine. These attacks are commonly referred to as Chiptuning and are offered by an industry-wide tuning sector.

Other examples for ECUs is the body control module, the transmission control module, the anti-lock brake control module etc.

The motor control unit is only one out of many ECUs which is susceptible to attacks. Other attacks on ECUs may cover the unauthorized activation of vehicle features or circumventions of the immobilizer system of a vehicle. Due to the increased networking of ECUs and the fact that ECUs carry out more and more sensitive tasks, the attack surface and the resulting financial loss caused by a successful attack on an ECU can be expected to grow significantly in the near future. In addition, successful attacks on one ECU endanger the whole vehicle board network and can have an impact to the whole vehicle safety system, which at worst, may cause the safety-characteristics no longer being satisfied.

In order to harden ECUs against attacks, security mechanisms which prevent reading out sensitive keying material and also prevent successful manipulation of the software of an ECU may be used. To provide the necessary trust primitives and resistance to physical attacks, the security mechanisms may be rooted in hardware. This approach prevents that sensitive information, e.g., cryptographic keys, are vulnerable to software attacks. For example, one or more of the electronic control units 101 may contain a dedicated peripheral module that provides such specific security operations at hardware level. An example of such a module is a high security module or hardware security module (HSM).

Figure 2:
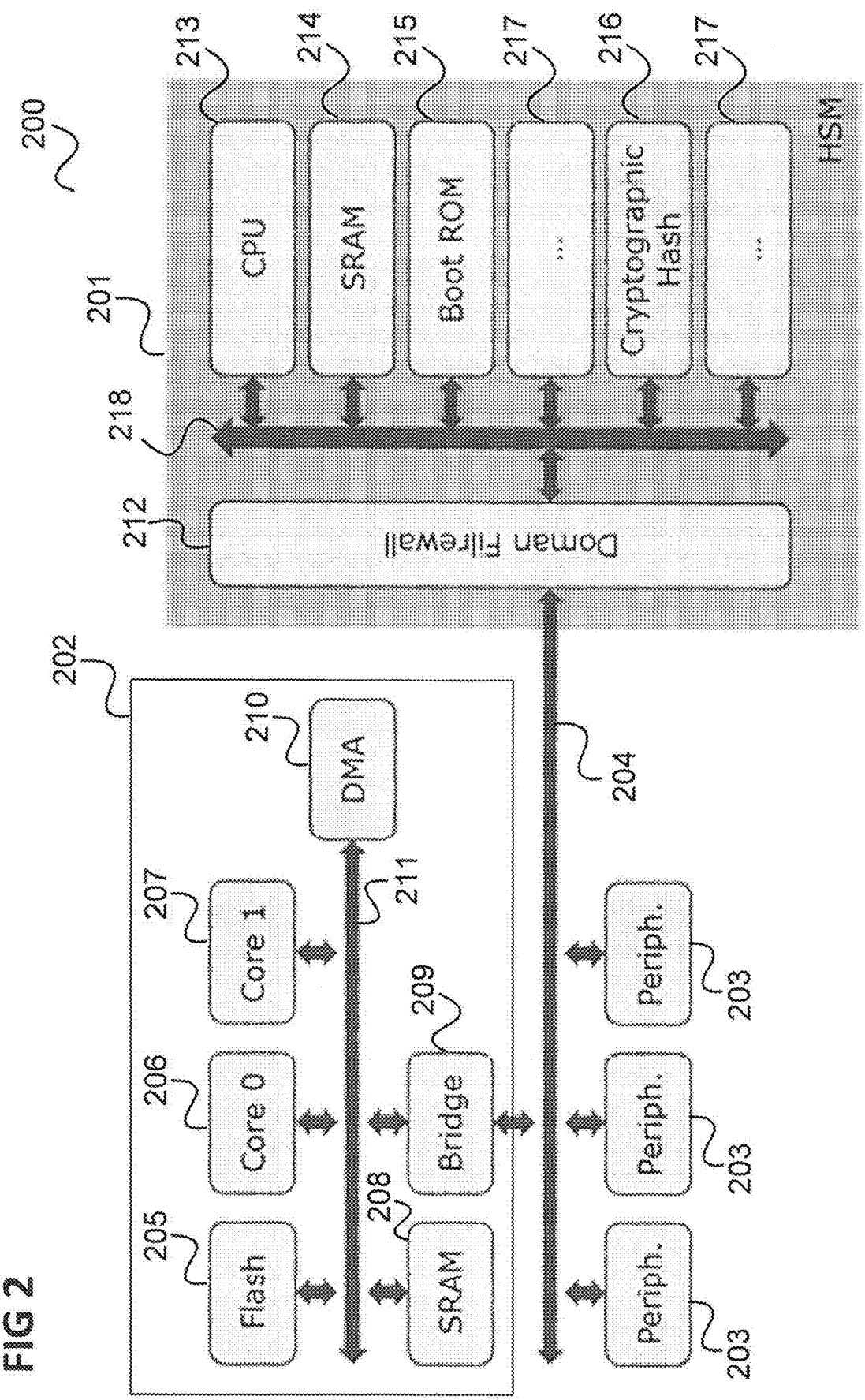
FIG. 2 shows an electronic control unit (ECU) including a hardware security module (HSM)

FIG. 2 shows an electronic control unit (ECU) 200 (also referred to as microcontrol unit) including an HSM 201.

The ECU 200 includes the HSM 201, an application core 202 and peripherals 203. The HSM 201, the application core 202 and peripherals 203 are coupled via a first bus 204.

The application core 202 includes a flash memory 205, a first application CPU core 206, a second application CPU core 207, an SRAM (static random access memory) 208, a bridge 209 and a DMA controller 210 which are coupled by means of a second bus 211. The second bus 211 may have a higher bandwidth than the first bus 204. The bridge 209 couples the first bus 204 to the second bus 211, i.e. allows the transfer of data between the first bus 204 and the second bus 211.

The HSM 201 includes a domain firewall 212, a CPU (central processing unit) 213, an SRAM 214, a Boot ROM (read only memory) 215, a cryptographic hash unit 216 and possibly further (e.g. security-related) components 217, coupled by a third bus 218. The HSM 201 may communicate with the first bus 204 via the domain firewall 212 which separates the HSM 201 from the rest of the ECU 200.

The HSM 201 may provide a structure to protect the system (or platform) integrity, to ensure the integrity and confidentiality of key material and to enhance cryptographic operations of the system. For example, it may protect the in-vehicle domain against security vulnerabilities by creating (e.g. when the ECU 200 sends a message via the bus 102, e.g. by means of one of the peripherals 203) and verifying (e.g. when the ECU 200 receives a message via the bus 102, e.g. by means of one of the peripherals 203) electronic signatures by means of an asymmetric cryptographic engine. In a lighter implementation, it may also secure the interaction between the ECU 200 and other components of the vehicle (such as other ECUs 101) by means of a symmetric cryptographic engine.

A critical aspect of security operations, as e.g. carried out by the HSM 201, is typically the performance aspect. In various embodiments, cryptographic hash operations are typically needed frequently at high performance. Performance increasing measures should, however, not break the chain of trust and introduce a security vulnerability.

In the example of FIG. 2, for calculation of a cryptographic hash, e.g. when the ECU intends to send control data whose integrity should be checked, the application core 202 sends the data through the HSM 201, which calculates the cryptographic hash (e.g. by means of the cryptographic hash unit 216). The hash may then also be further processed by the HSM 201 (e.g. compared with a reference hash value stored earlier to verify the integrity of the data).

In contrast, in the following, an example is described in which the cryptographic hash function is placed within the DMA controller 210 outside of the sphere of (i.e. outside of) the HSM 201 to improve performance.

Figure 4:
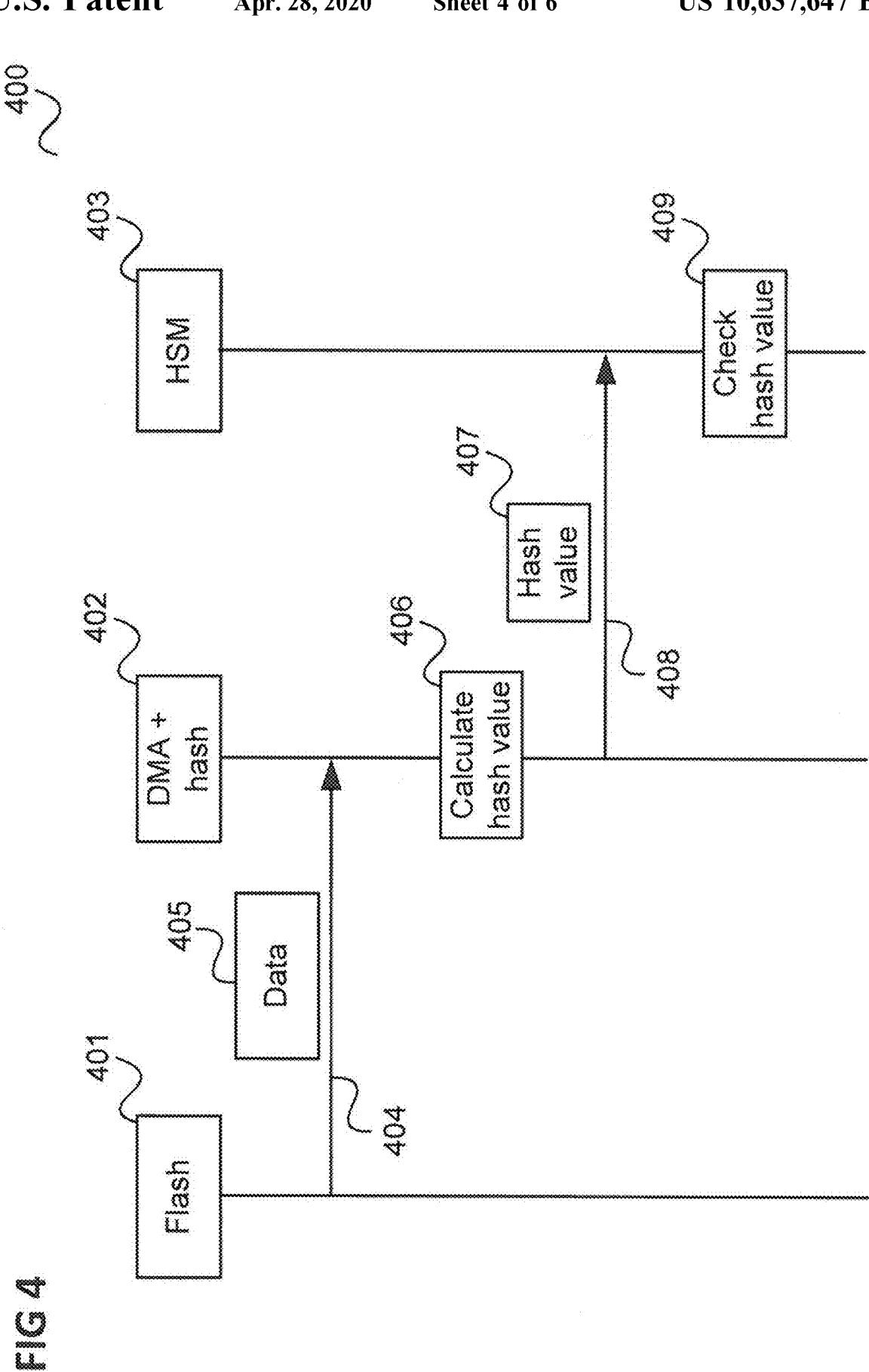
FIG. 4 shows a data flow diagram according to an embodiment.

Direct memory access (DMA) is a feature of data processing systems that allows certain hardware subsystems within the computer to access system memory for reading and/or writing independently of a central processing unit (CPU), e.g. the cores 206, 207 in the example of FIG. 4. Many hardware systems use DMA including disk drive controllers, graphics cards, network cards, and sound cards. Computers provided with DMA channels can typically transfer data to and from devices with much less CPU overhead than computers without a DMA channel.

DMA is typically used to allow a device to transfer data without exposing a CPU of the device to a heavy load. If the CPU had to copy each piece of data from the source to the destination, this would be typically slower than copying normal blocks of memory, since access to I/O devices over a peripheral bus is generally slower than normal system RAM. During this time the CPU would be unavailable for other tasks involving CPU bus access, although it could continue doing any work which did not require bus access.

A DMA transfer essentially copies a block of memory from one memory to another memory. In the example of FIG. 2, one memory may for example be the flash 205 and the other memory may be the SRAM 208 or may be a buffer for sending data over the bus 102 of FIG. 1, wherein the buffer (and bus access) is for example provided by one of the peripherals 203.

While the CPU initiates the transfer, it does not execute it. The transfer is performed by the DMA controller. A typical usage of DMA is copying a block of memory from system RAM to or from a buffer. The operation does not need much capacity of the processor, which as a result can be scheduled to perform other tasks. DMA is therefore an important factor for high performance embedded systems.

A DMA controller generally transfer data from a data source location to a data destination location. In a safety critical system it is important that the DMA transfers perform the correct transfer operation.

As in the example of FIG. 2, a DMA controller may perform data transactions within an embedded system which also includes a host CPU (e.g. cores 206, 207 in FIG. 2). The CPU is responsible for supervising the correct operation of the DMA. A sequence of linked DMA transactions is correctly ordered by configuring the DMA and Interrupt Router to trigger the start of a new DMA transaction on completion of the preceding transaction in the sequence. A sequence of linked DMA transactions is usually ordered by either of the following methods:

Configuring the DMA controller and interrupt router, such that the completion of an on-going DMA transaction initiates the start of the next DMA transaction via a hardware trigger.

The CPU intervenes between DMA transactions and initiates the start of the next DMA transaction via a software trigger on receiving a DMA traffic management semaphore that the preceding DMA transaction has completed.

As mentioned above, according to one embodiment, a cryptographic hash function is implemented with a DMA controller, such as in the electronic control unit (ECU) 200 of FIG. 2. This is illustrated in FIG. 3.

Figure 3:
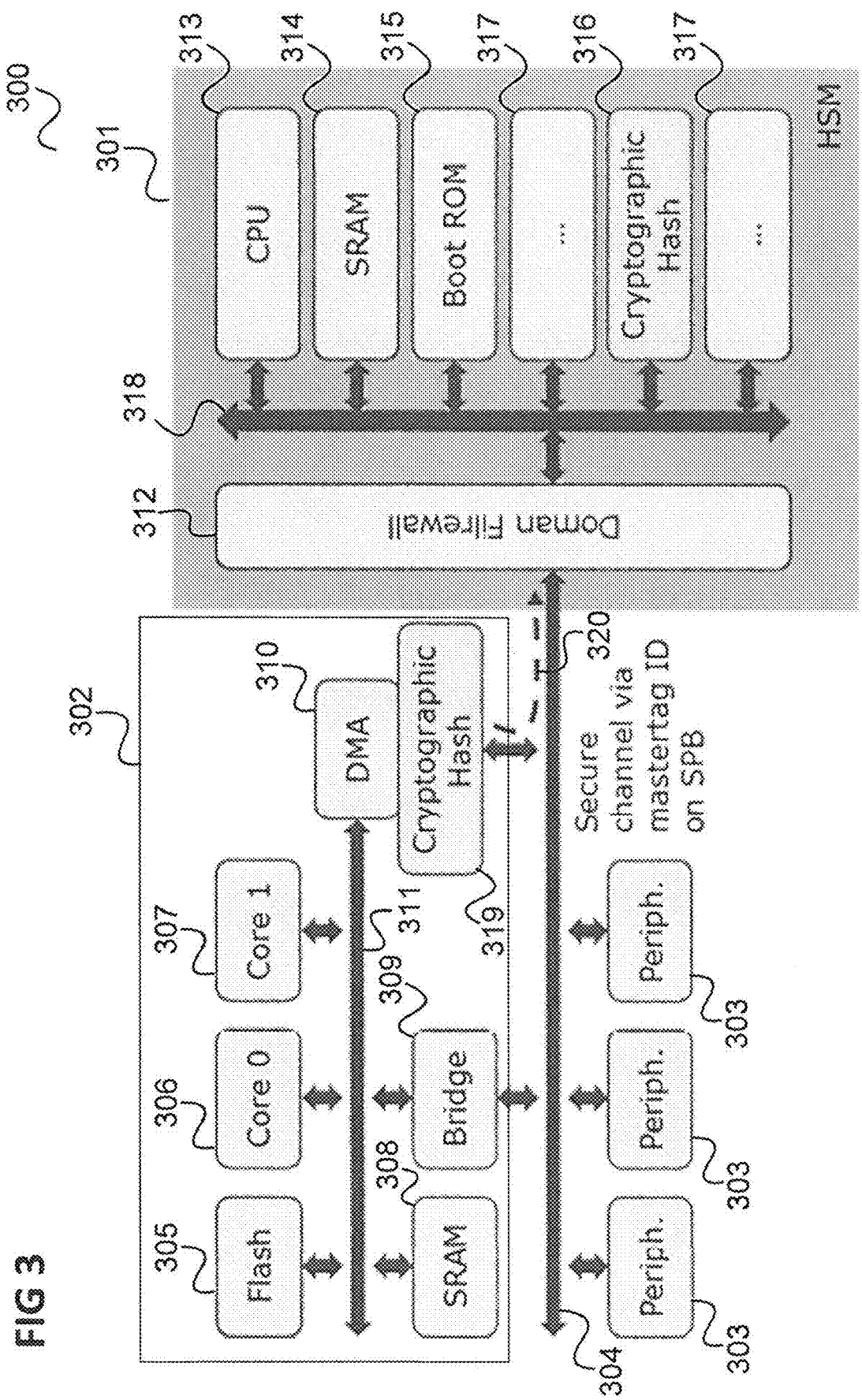
FIG. 3 shows an ECU according to an embodiment.

FIG. 3 shows an electronic control unit (ECU) 300.

The ECU 300 includes an HSM 301, an application core 302 and peripherals 303 coupled by a first bus 304 as described with reference to FIG. 2. By way of example, the HSM 301 and the application core 302 include components 305 to 318 as described with reference to FIG. 2, except that the DMA controller 310 is provided with a cryptographic hash unit 319.

Furthermore, a private channel 320 is provided between the cryptographic hash unit 319 and the HSM 301 that allows, in a secure way, transferring of the cryptographic hash result from the cryptographic hash unit 319 to the HSM 301 for further processing (e.g. checking or storage for later comparison with another hash value).

The provision of the DMA controller 310 with the cryptographic hash unit 319 may for example allow higher data throughput since instead of complete data, a hash value may be transported over the second bus 311, i.e. for an integrity check of data read from the flash 305 or the SRAM 308. Similarly, overall power consumption of the ECU 300 may be reduced.

Furthermore, processing is offloaded from the HSM.

It should be noted that positioning a cryptographic hash function in the DMA controller 310 is possible as the cryptographic hash function does not require knowledge of a secret key or other secret data stored within the HSM.

An example of a usage of the cryptographic hash function provided by the cryptographic hash unit 319 is described in the following with reference to FIG. 4.

FIG. 4 shows a data flow diagram 400 according to an embodiment.

The data flow 400 takes place between a flash memory 401 corresponding to the flash 305, a DMA controller 402 providing a cryptographic hash function corresponding to the DMA controller 310 with the cryptographic hash unit 319 and an HSM 403 corresponding to the HSM 301.

In 404, the DMA controller 402 reads data 405 from the flash 401. For example, one of the cores 406, 407 has configured the DMA controller 402 accordingly.

The data 405 is for example control data, e.g. for an engine control of a vehicle, whose integrity should be verified to detect in case it has been tampered with, e.g. to detect whether an attacker has modified the control data without permission, i.e. to perform an illegal tuning of the vehicle.

In 406, the DMA controller 402, by means of its cryptographic hash function, generates a hash value 407 of the data 405 and transmits the hash value 407 in 408 to the HSM 403, e.g. via the private channel 320 in a secure manner.

The private channel 320 may for example be implemented by means of a special tag (e.g. a mastertag ID) that the DMA controller 402 includes in a message that it sends via the second bus 311 which results in that only the HSM 403 reads the message while all other components are configured to ignore the message having this tag. The second bus 311 may for example be an SPB (system peripheral bus).

According to various embodiments, the generation or calculation of a hash value refers to the creation of a hash value according to a hash function, e.g. a cryptographic hash function such as a SHA (secure hash algorithm) hash function.

In 409, the HSM 403 checks the hash value, e.g. by comparison with a reference hash value, which has for example been determined earlier (e.g. in the factory) based on original control data to verify that the control data has not been altered in the meantime. It may then report a corresponding result, e.g. to one of the cores 306, 307 to allow usage of the control data, e.g. allow a control of the vehicle's engine based on the control data or to allow the transmission of the control data to other components, e.g. via the bridge 309.

The HSM 403 may further con FIG. the flash memory 401 and the DMA controller 402 to communicate securely, e.g. by providing a symmetric key to both the DMA controller 402 and the flash memory 401.

Figure 5:
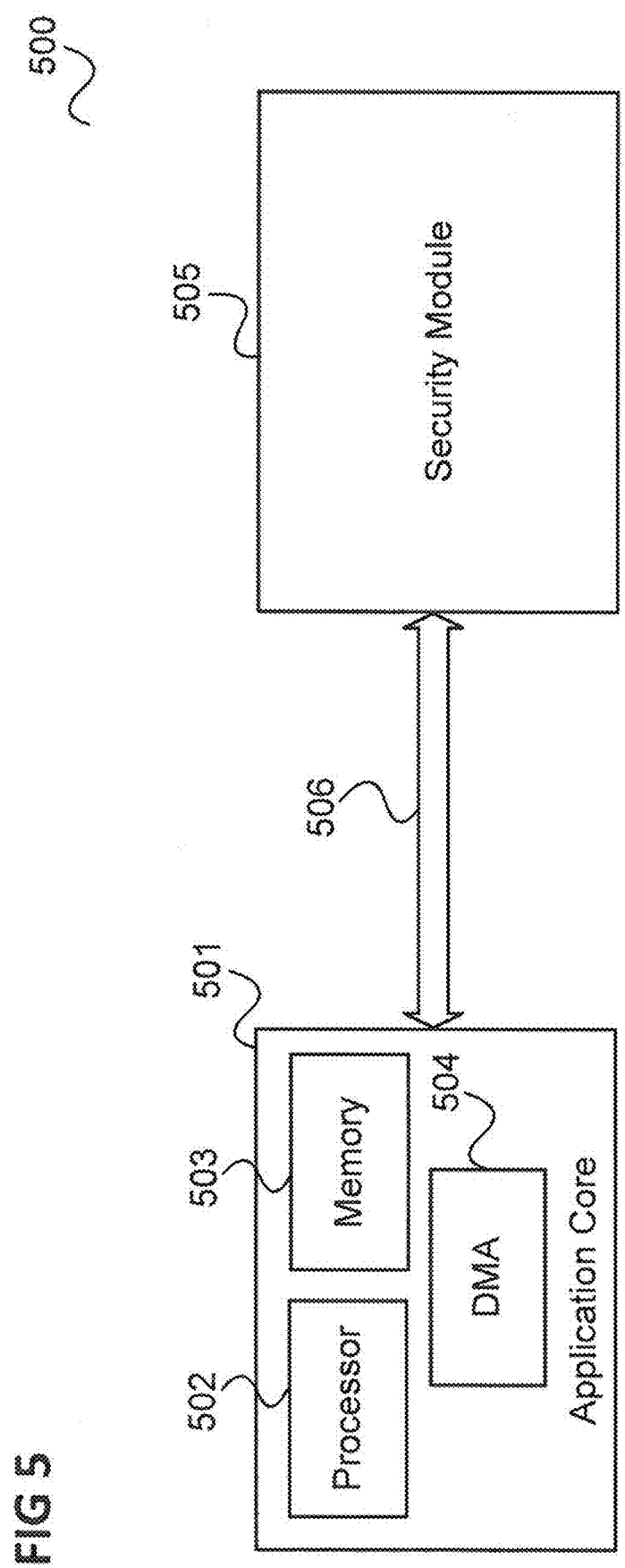
FIG. 5 shows a control device according to an embodiment.

In summary, according to various embodiments, a control device as illustrated in FIG. 5 is provided.

FIG. 5 shows a control device 500 according to an embodiment.

The control device 500 includes an application core 501 including a processor 502, a memory 503 and a direct memory access controller 504.

Further, the control device includes a security module 505 coupled to the application core 501 via a computer bus 506.

The direct memory access controller 504 is configured to read data from the memory, generate a hash value for the data and provide the hash value to the security module 505 via the computer bus and the security module 505 is configured to process the hash value.

According to another embodiment, in other words, a cryptographic hash unit is located, i.e. a cryptographic hash function is implemented, outside of a (e.g. hardware) security module of a control device at a direct memory access controller. For example, the cryptographic hash unit is separated from the security module by means of a computer bus or a firewall.

The control device 500 for example carries out a method for securing data as illustrated in FIG. 6.

FIG. 6 shows a flow diagram 600.

In 601, a direct memory access controller reads data from a memory of an application core which includes the memory, the direct memory access controller and a processor.

In 602, the direct memory access controller generates a hash value for the data.

In 603 the direct memory access controller provides the hash value to a security module via a computer bus coupling the application core and the security module.

In the following, various embodiments are described.

Embodiment 1 is a control device as illustrated in FIG. 5.

Embodiment 2 is the control device of embodiment 1, wherein the security module is configured to compare the hash value with a reference hash value.

Embodiment 3 is the control device of embodiment 1 or 2, wherein the security module is configured to verify the integrity of the data based on the hash value.

Embodiment 4 is the control device of any one of embodiments 1 to 3, wherein the direct memory access controller is configured to provide the hash value to the security module via a private channel.

Embodiment 5 is the control device of any one of embodiments 1 to 4, wherein the security module includes an interface to connect to the computer bus and a firewall arranged between the interface and further components of the security module.

Embodiment 6 is the control device of any one of embodiments 1 to 5, wherein the security module includes at least one processor and at least one memory.

Embodiment 7 is the control device of any one of embodiments 1 to 6, wherein the security module includes a memory encryption unit.

Embodiment 8 is the control device of any one of embodiments 1 to 7, wherein the security module includes one or more cryptographic accelerators.

Embodiment 9 is the control device of any one of embodiments 1 to 8, wherein the control device is a vehicle electronic control unit.

Embodiment 10 is the control device of any one of embodiments 1 to 9, wherein the control device is configured to control a component of a vehicle.

Embodiment 11 is the control device of any one of embodiments 1 to 10, wherein the data are vehicle component control data.

Embodiment 12 is the control device of any one of embodiments 1 to 11, wherein the data are data to be sent to another control device connected to the control device by a second computer bus.

Embodiment 13 is the control device of embodiment 12, wherein the control device includes a bridge to connect to the second computer bus.

Embodiment 14 is the control device of any one of embodiments 1 to 13, wherein the second computer bus is an in-vehicle bus.

Embodiment 15 is the control device of any one of embodiments 1 to 14, wherein the security module is a hardware security module.

Embodiment 16 is the control device of any one of embodiments 1 to 15, wherein the security module includes a countermeasure against a physical attack.

Embodiment 17 is the control device of embodiment 16, wherein the countermeasure is an active sensor to a detect fault and glitching attacks.

Embodiment 18 is the control device of any one of embodiments 1 to 17, wherein the security module is configured to secure the communication between the memory and the direct memory access controller.

Embodiment 19 is the control device of embodiment 18, wherein the security module is configured to secure the communication by means of providing at least one cryptographic key for encrypting data exchanged between the memory and the direct memory access controller.

Embodiment 20 is the control device of any one of embodiments 1 to 19, including a chip including the application core and the security module.

Embodiment 21 is a method for securing data as illustrated in FIG. 6.

A further embodiment is a data processing device including a direct memory access controller and a hardware security module, wherein the direct memory access controller is configured to generate a hash value for data transferred by the direct memory access controller and the hardware security module is configured to process the hash value.

A further embodiment is a data processing device including a direct memory access controller, a hardware security module and a cryptographic hash unit located at the direct memory access controller.

It should be noted that embodiments described in context of one of the control devices are analogously valid for the other control devices and the method for securing data and vice versa.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A control device, comprising:
   an application core comprising a processor, a memory, a bridge, and a direct memory access controller; and
   a security module coupled to the application core via a computer bus coupling the bridge of the application core and the security module;
   wherein the direct memory access controller is configured to read data from the memory, generate a hash value for the data and provide the hash value to the security module via the computer bus; and
   wherein the security module is configured to compare the hash value, obtained from the direct memory access controller, with a reference hash value and to provide a report of the comparison to the application core via the computer bus;
   wherein the application core is further configured to transmit the report obtained from the security module to a peripheral component via the bridge,
   wherein the security module comprises an interface to connect to the computer bus and a firewall arranged between the interface and further components of the security module.

2. The control device of claim 1, wherein the security module is configured to verify an integrity of the data based on the comparison of the hash value with the reference hash value and further configured to report to the processor via the computer bus, a result of the verification.

3. The control device of claim 1, wherein the direct memory access controller is configured to provide the hash value to the security module via a private channel.

4. The control device of claim 1, wherein the security module comprises at least one processor and at least one memory.

5. The control device of claim 1, wherein the security module comprises a memory encryption unit.

6. The control device of claim 1, wherein the security module comprises one or more cryptographic accelerators.

7. The control device of claim 1, wherein the control device is a vehicle electronic control unit.

8. The control device of claim 1, wherein the control device is configured to control a component of a vehicle.

9. The control device of claim 1, wherein the data are vehicle component control data.

10. The control device of claim 1, wherein the security module is a hardware security module.

11. The control device of claim 1, wherein the security module comprises a countermeasure against a physical attack.

12. The control device of claim 11, wherein the countermeasure is an active sensor to a detect fault and glitching attacks.

13. The control device of claim 1, wherein the security module is configured to secure a communication between the memory and the direct memory access controller.

14. The control device of claim 13, wherein the security module is configured to secure the communication by means of providing at least one cryptographic key for encrypting data exchanged between the memory and the direct memory access controller.

15. The control device of claim 1, further comprising: a chip comprising the application core and the security module.

16. The control device of claim 2, wherein the computer bus is a first computer bus and wherein the application core further comprises a second computer bus, wherein the processor, memory, direct memory access controller and the bridge are directly coupled to the second bus of the application core, and wherein the application core is configured to transmit the data to a peripheral component via the bridge and the first computer bus in response to the report indicating verification of the hash value by the security module.

17. The control device of claim 16, wherein the first computer bus is an in-vehicle bus.

18. A method for securing data, the method comprising:
   reading, by a direct memory access controller, data from a memory of an application core which comprises the memory, the direct memory access controller, a bridge, and a processor;
   generating, by the direct memory access controller, a hash value for the data;
   providing the hash value to a security module via a computer bus coupling the bridge of the application core and the security module;
   comparing, by the security module, the hash value with a reference hash value;
   providing, by the security module, a report of the comparison to the application core via the computer bus; and transmitting after obtaining the report, the data from the application core to a peripheral component via the bridge, wherein the security module comprises an interface to connect to the computer bus and a firewall arranged between the interface and further components of the security module.

\* \* \* \* \*